United States Patent
Hicks

(10) Patent No.: US 10,345,447 B1
(45) Date of Patent: Jul. 9, 2019

(54) DYNAMIC VISION SENSOR TO DIRECT LIDAR SCANNING

(71) Applicant: Luminar Technologies, Inc., Orlando, FL (US)

(72) Inventor: Richmond Hicks, Orlando, FL (US)

(73) Assignee: Luminar Technologies, Inc., Orlando, FL (US)

( * ) Notice: Subject to any disclaimer, the term of this patent is extended or adjusted under 35 U.S.C. 154(b) by 0 days.

(21) Appl. No.: 16/020,481

(22) Filed: Jun. 27, 2018

(51) Int. Cl.
| | |
|---|---|
| *G01S 17/93* | (2006.01) |
| *G01S 17/89* | (2006.01) |
| *G01S 7/48* | (2006.01) |
| *G01S 7/486* | (2006.01) |
| *G01S 17/02* | (2006.01) |
| *H04N 5/3745* | (2011.01) |
| *H04N 5/235* | (2006.01) |
| *G06K 9/00* | (2006.01) |

(52) U.S. Cl.
CPC .......... *G01S 17/936* (2013.01); *G01S 7/4802* (2013.01); *G01S 7/486* (2013.01); *G01S 7/4808* (2013.01); *G01S 17/023* (2013.01); *G01S 17/89* (2013.01); *G01S 17/026* (2013.01); *G06K 9/00624* (2013.01); *G06K 9/00791* (2013.01); *H04N 5/2351* (2013.01); *H04N 5/3745* (2013.01)

(58) Field of Classification Search
None
See application file for complete search history.

(56) References Cited

U.S. PATENT DOCUMENTS

| | | | |
|---|---|---|---|
| 2015/0319369 A1* | 11/2015 | Serrano Gotarredona | .................. H04N 5/243 250/208.1 |
| 2016/0096477 A1* | 4/2016 | Biemer | ................ H04N 5/2258 348/148 |
| 2016/0274589 A1* | 9/2016 | Templeton | ........... G05D 1/0246 |
| 2018/0143302 A1* | 5/2018 | Osiroff | .................... G01S 7/497 |
| 2019/0007678 A1* | 1/2019 | Perez-Ramirez | .... H04N 19/109 |

OTHER PUBLICATIONS

Lichtsteiner et al., "A 128×128 120 dB 15 µs Latency Asynchronous Temporal Contrast Vision Sensor" IEEE Journal of Solid-State Circuits, vol. 43, No. 2, Feb. 2008 (Year: 2008).*

* cited by examiner

*Primary Examiner* — John C Kuan

(57) ABSTRACT

A dynamic vision sensor (DVS) camera is described that directs scanning of a lidar. In one example, a DVS has an array of pixels, wherein each DVS pixel comprises a photodetector, and is configured to detect temporal contrast and generate an event in response. A lidar system has a light source configured to emit light, a scanner configured to direct the emitted light along a scan pattern contained within a field of regard of the lidar system, and a receiver configured to detect at least a portion of the emitted light scattered by one or more remote targets in a scene. A processor is coupled to the lidar system and to the dynamic vision sensor and receives the events, identifies a region of interest in the field of regard that corresponds to DVS pixels that generated the events, and adjusts a scan parameter of the lidar system in the region of interest.

23 Claims, 8 Drawing Sheets

DYNAMIC VISION SENSOR TO DIRECT LIDAR SCANNING

TECHNICAL FIELD

The present description relates generally to lidar and in particular to a dynamic vision sensor camera to direct a scan with a lidar system.

BACKGROUND

Current lidar systems scan the environment to build a point cloud which in turn delivers a detailed understanding of the shape and location of the lidar's surroundings to any of a variety of scene understanding systems, such as vehicle navigation and autonomous vehicle (AV) systems. Advanced lidar systems may operate by scanning emitted light through a sequence of horizontal rows or scan lines. A receiver then records the return from each emitted pulse or wave along each scan line. After traversing all of the rows, and capturing all of the returns, a single frame has been captured by the lidar imager. The frame rate, i.e. the rate at which single frames are captured, is affected by the number of points on each row and the number of rows that are scanned to capture a full frame.

As the distance and detail detected by a lidar system increases, the speed of the system and, in particular, the frame rate decreases. The scan rate can be limited by such factors as the light pulse's travel time from the lidar to an object and back, the time required to scan the emitted beam, and the number and width of rows to be scanned. These factors all drive the system toward a lower frame rate. In other words, as the size and resolution of the lidar frame increases, the time required for the lidar to scan all of the rows required to make a complete image also increases. A slower frame rate increases both latency in the system and increases global and local motion artifacts. Some of these factors can be overcome with additional computational power, faster mirror scanners and other measures. Some of the factors, such as longer travel time from the lidar to a more distant target cannot be overcome.

It is possible to drive the scanner of the lidar in a different mode so that only a small part of the full frame is captured. A smaller scan area allows a higher frame rate, higher resolution, or faster result to be captured for the small area than for a full scan. By interrupting the normal full frame scan for a detail scan, the lidar obtains detailed information about a partial area of the scene at the cost of delaying the next full frame scan.

To interrupt a normal full frame scan, a small area must be selected. For an AV, most of the vehicle surroundings do not usually include details that are important for navigation. In some systems, a visual light camera is used in AV systems to compensate for the slower frame rate of the lidar. The camera images are processed to select areas of interest. The lidar can be directed to perform a more detailed scan of the selected areas.

BRIEF DESCRIPTION OF THE DRAWINGS

The appended claims set forth the features of the invention with particularity. The present invention is illustrated by way of example, and not by way of limitation, in the figures of the accompanying drawings, in which like reference numerals refer to similar elements.

DESCRIPTION OF EXAMPLE EMBODIMENTS

Figure 1:
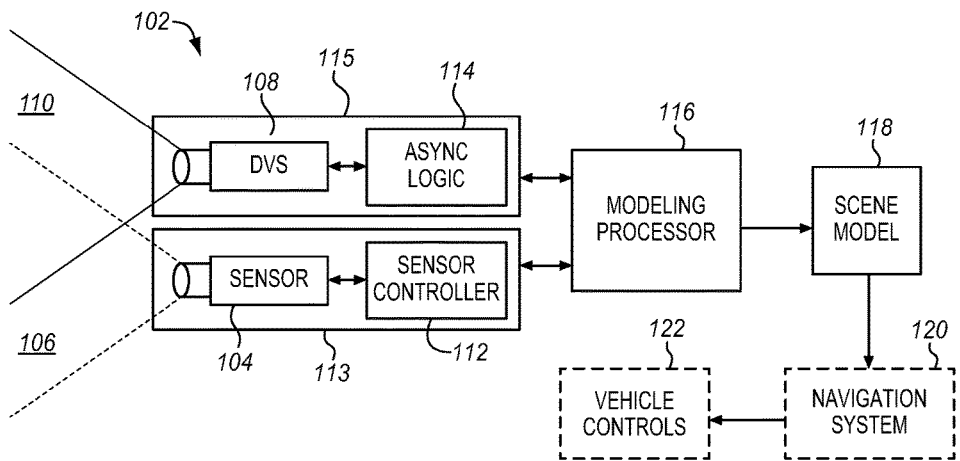
FIG. 1 is a block diagram of a scene modeling system.

The lidar frame capture rate can be improved by scanning at lower resolution. Detail in a particular area of a frame can be improved by a more detailed scan of a particular small area. Both of these strategies bring the risk of reducing lidar data for the overall scene in front of the sensor. In a fast changing scene, there is great risk that an important object will be missed while another object is being carefully scanned in detail. In such a situation, great care must be exercised in selecting the areas of interest for a detailed scan. In addition, the means of selecting the area of interest should be significantly faster than the lidar scan time. Otherwise, there is no benefit to interrupting the normal scan in order to focus on a particular area. The detailed scan could simply wait for the next frame to be captured.

When a separate visible light camera is directed at the scene to identify areas of interest, there are still delays. The areas of interest are determined using some kind of object classification and selection which is slow. First, multiple frames must be collected and then they are compared and complex algorithms are executed for object detection and classification, then decisions are made as to which objects merit a detailed lidar scan. This analysis is either slow or computationally expensive. If decisions are made using a single frame, then accuracy is reduced. A high speed camera system can reduce delay, but is still limited by the maximum frame rate. In addition, higher frame rates generate more frames that must be analyzed using more extensive processing to determine areas of interest to steer the lidar.

A DVS (Dynamic Vision Sensor) camera is described herein for use in selecting areas of interest. Instead of generating frames for an image processor which then performs complex object detection and classification and selection, the DVS output can be sent straight to the lidar scanning beam control.

A DVS has a photodetector array similar to that of a frame capture camera, however, the DVS does not capture and compile frames but senses illumination changes or events in individual DVS pixels. The illumination change generates an event for the respective DVS pixel when the change happens. There is no frame capture or frame rate. Accordingly, a DVS, by nature, detects changes in a scene with low latency. This information can be used to direct the lidar to scan portions of the scene that are changing with low (~μsec) latency.

The DVS is faster than the lidar because it detects light from the scene whereas the lidar has to illuminate the scene and then detect the reflection back from the scene. This delay increases with distance. The lidar also has latency that comes from processing, laser targeting, scanning, etc. The DVS is faster than a frame capture camera with less processing because it does not generate image frames that must then be analyzed. Instead it signals an event as soon as there is a change in illumination intensity in an area of the scene. There is no row sampling delay and no need to analyze a captured frame to find an area of interest. An event may be recognized even before a cycle of sample and hold might be completed for a conventional frame capture camera.

In addition to the low latency, the DVS operates on a different principle than the visual light frame capture camera. The frame capture camera feeds into logic that tries to determine if there is a significant or ambiguous area in view. After the area is characterized, then more information is captured from the lidar. The DVS-based system detects movement rather than objects. The lidar return may then be used to determine what the movement relates to and whether the movement is significant. The resultant lidar return may also be processed to identify or classify objects. The DVS-based system sends events to the lidar when change is found in the DVS field of regard. This can be further filtered by a processor in the DVS or in the lidar or a separate processor by sending events to the lidar only when changes occur that are not predicted based on the current understanding of the scene. Objects already detected and classified that cause changes to the scene can be tracked using standard resolution and scan rates while unexpected changes in the scene detected by the DVS can be used to trigger a reduced latency, higher resolution, or higher frame rate lidar scan or some combination of the three. The only processing that might be required between the DVS camera and the lidar is to determine how large of a contiguous area has the change and how much of that area should be included in the small area lidar scan.

The AV system has a lidar and a DVS and, optionally other sensors. The DVS flags any areas in the scene where there are changes in received light intensity. The lidar then scans that area as a possible area of interest at increased resolution. This approach emulates human and animal vision in that areas of movement attract the most attention.

Visible light frame capture cameras may also be a part of a sensor suite to provide other capabilities including recognizing traffic signs and signals, inter alia, that are not visible to the lidar. These cameras can be used to supplement the DVS camera result. Objects may be of interest even if they are not moving. Fixed objects of interest can be recognized and identified by the frame capture camera to also direct the lidar scanner.

FIG. 1 is a block diagram of a scene modeling system with a lidar system augmented with a DVS camera. The scene modeling system 102 has a lidar system 113 with a lidar field of regard 106 and a DVS camera system 115 with a DVS field of regard 110. The two fields of regard overlap so that objects imaged by the DVS are within the point cloud generated by the lidar. The scene within the fields of regard may be of a portion of the road in front of the vehicle and along which the vehicle is traveling. Other scenes may be views to the side and to the rear. Alternatively, the scene may be of a single location in which other objects are moving with respect to a stationary sensor system. Such a fixed sensor system may be used for observation, monitoring, surveillance, or security purposes, among others. In one embodiment, the scene is a busy traffic area and the sensor is placed near the scene to identify objects and to warn incoming air or land vehicles of the locations of vehicles already in the scene.

The lidar system 113 has a lidar 104 coupled to a lidar controller 112 that drives and controls the lidar and receives return data generated by the lidar. There may be an optical system within the lidar system 113 for directing laser pulses, modulated waves or any other format of light to the scene and for directing the resulting laser reflections into a detector of the lidar 104. The lidar controller may be integrated into the lidar or implemented as multiple components. The lidar controller generates a point cloud in which each point represents a three-dimensional position in the scene in the field of regard. The particular configuration, resolution, and other information generated by the lidar processor and the manner of operation of the lidar processor may be modified to suit different implementations. The point cloud is sent to a 3D modeling processor 116 to be used in generating a 3D model 118 of the scene. The controller may alternatively be a part of the modeling processor or independent as shown.

The lidar controller 112 sends a sequence of point clouds or point cloud changes over time so that a motion vector can be associated with each point in the point cloud. In embodiments, the lidar has a frame rate and completes a full scan of its field of regard after each frame. Each complete frame provides an update to the point cloud. Motion vectors are determined by comparing point positions in the cloud for each frame. The motion vector for each frame indicates how that point has moved from the previous frame. In embodiments, the motion vectors are compensated for movement of the vehicle and the lidar through the scene.

The motion vectors may be used to group points together as relating to the same object. As an example, a vehicle moving down the road in front of the lidar will be represented by many points. These points will all move toward and away from the lidar together as the corresponding vehicle will move toward and away from the lidar.

The DVS system 115 has an intensity change sensor 108 that receives incident light through an optical system on an array of photodetectors across its field of regard 110. The optical system focuses light generated by or reflected from the scene onto the intensity change sensor 108. The images are sent to asynchronous logic 114, although in other embodiments synchronous logic may be used. In embodiments, the photodetectors in the array respond to light to each generate a voltage that represents the amount of incident light. As long as the illumination level is constant, then charge will accumulate at a constant rate. If the illumination intensity changes, then the charge will accumulate slower or faster. The async logic 114 determines this change in any of a variety of ways and produces a signal for the respective photodetector indicating a change in the illumination level or in the photodetector output.

In some embodiments a reset signal is used to measure the accumulated charge over a predetermined period of time between the resets. The measurement may then be compared to a threshold or applied to a differencing circuit or the like. In other embodiments a delta modulator may be used to compare delta subtraction feedback. In any event, the change in the illumination level over time is a temporal change. With some circuit complexity, a change in contrast may also be measured as a change in a level of one DVS pixel compared to neighboring DVS pixels. The temporal contrast indicates a moving edge of some structure and does not measure an overall change in lighting of the scene.

The async logic 114 receives the outputs from the DVS and then uses this information to determine areas of temporal contrast in the DVS pixel array. As a result, a particular part of the image may be identified as corresponding to an edge of a moving object such as a vehicle, or a pedestrian.

If the sensors are mounted to a moving vehicle then a wall, a curb, a street sign. etc. may be identified as moving with respect to the vehicle. The identified temporal contrast areas are then sent either to the lidar controller 112 for a more detailed lidar scan or to the modeling processor 116 to determine whether a more detailed scan is appropriate. The lidar controller may be discrete as shown or it may be incorporated into the modeling processor.

A variety of different visible light photodetector sensors may be used, such as CMOS (Complementary Metal Oxide Semiconductor) or CCD (Charge Coupled Device) photodetectors, with different color and sensitivity characteristics. Visible light is suggested because objects designed for human perception are best perceived using visible light. In addition, visible light sensors and circuits are commonly available. The DVS camera may have a different or extended spectrum so that only some colors are perceived or so that infrared or ultraviolet are also perceived by the sensor.

The 3D modeling processor 116 combines the point cloud, the object classification and any other suitable system information to generate a 3D model 118 of the scene. This model will include any classified objects and the sizes and positions of the objects in three dimensions. The object classification allows the future behavior of the object to be predicted. As an example, a tree will remain stationary and the outer periphery of the tree will likely bend in a collision. A pedestrian may move in any direction at any time, but will never move very fast. The sizes and positions of the objects allows the scene to be fully characterized.

The 3D model 118 may be used for any of a variety of different purposes. In this example, the model is optionally provided to a vehicle navigation system 120. The vehicle navigation system is optionally coupled directly or indirectly to vehicle controls 122 to direct the vehicle on an intended path. The vehicle is referred to herein primarily as an automobile but the systems and methods described herein are not so limited. Any type of land vehicle whether it drives on roads, paths, guideways, tracks, or open areas, indoors or outdoors, may benefit from the sensor and scene modeling systems described herein. Water vehicles, such as boats, ships, or submarines and airborne vehicles may also benefit from the systems and methods described herein. In addition while the system is described as having a field of regard in a direction of forward travel, sensors may be directed in other directions and additional sensors may be used to observe multiple directions simultaneously. The 3D model may include objects in multiple different directions from the vehicle.

For simplicity, the description herein treats the DVS and the lidar as if there is a direct and one-to-one correlation between the DVS field of regard 110 and the lidar field of regard 106. In practice this is not necessary and may not be desired. There may be multiple DVS cameras and multiple lidars and respective fields of regard may not match. There may also be areas seen by a DVS but not a lidar and vice versa. As an example, there may be multiple narrow field of view DVS cameras to achieve the desired resolution for far distances. A high resolution DVS camera with a wide field of view may be large and expensive compared to multiple narrower field of view cameras with the same resolution. Smaller cameras with smaller fields of view might be used to cover the lidar field of regard. Similarly, a lidar with a smaller field of regard may be able to perform a scan more quickly than a lidar with a wider field of regard. There may also be additional sensors for areas directly in front of a moving vehicle. Accordingly, the systems and methods herein may be adapted to suit different sensor suite designs.

Figure 2:
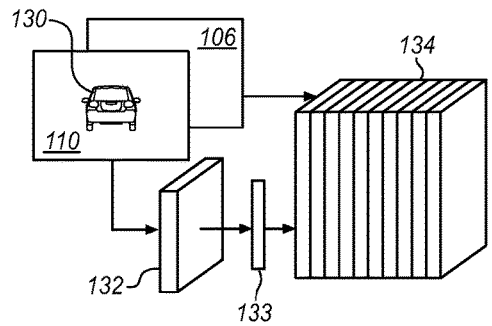
FIG. 2 is a diagram of correlating a scene as perceived by the lidar system to the DVS field of view.

FIG. 2 is a diagram of correlating a scene as perceived by a lidar system to the DVS field of regard. As shown, there is a lidar frame for the illustrated field of regard 106 and a DVS field of regard 110. Both systems have captured a view of the scene and the back of a vehicle 130 appears in the scene in both views and can be perceived by both systems. The lidar frame 106 is shown in 2D to allow it to be more easily compared to the DVS view 110. While the DVS view 110 is shown as an image of the vehicle only temporal contrast will be captured. If the vehicle is moving, then leading and trailing edges of the vehicle will be generated by the DVS, for example. The diagram is greatly simplified so that there is only one object, however, there may be many more. The fields of regard 106, 110 are not perfectly aligned, as shown. In practice, the DVS may cover only a small part of the lidar field of regard or vice versa and multiple DVS cameras or lidars may be used to cover the entire scene as mentioned above. The optical systems may be adjusted to improve alignment and the physical mounting structures for the two systems may be configured to reduce independent movement of the two systems. However, with higher resolution, the precision of the alignment must also be improved. In embodiments, the two fields of regard are calibrated and correction factors 133 may be determined to correlate DVS pixel positions with frames of the lidar.

The pixel positions from the DVS are typically 2D while the frames of the lidar are typically 3D. The lidar frames are used to generate a 3D point cloud 134 as mentioned above. The points in the point cloud each relate a reflection from the lidar received at a position on the lidar sensor to a 3D position in the frames of the lidar. When the DVS system 115 reports a temporal contrast as an event, that event may be represented as a part of a 2D image or 2D list of points or pixels that are included in the event. The set of points 132 of FIG. 2 may represent a buffer that contains the DVS pixels of the entire event in the field of regard 110 or just a part of the edge of the possible object 130. FIG. 2 shows this set of points 132 from the DVS that are correlated to the lidar point cloud 134.

This position of this event in the DVS view is adjusted by correction factors 133 to correlate the DVS to the lidar frame. The correction factors 133 may be stored in another memory as a single horizontal and vertical adjustment value for all DVS pixels or as an array of factors to apply to different ones of the DVS pixels 132. In other words, the DVS pixels 132 of the event 130 are correlated to the 3D point cloud by applying the correction factors 133 to shift the DVS pixel positions to corresponding pixel positions of the lidar point cloud 134. The selected DVS pixels 132 may be presented as a matrix, table, or list and the correction factors may be one or more arithmetic or logarithmic factors that may be applied with a look-up table or a mapping table. This configuration may be in the lidar controller or the modeling processor. The adjusted position or points may then be applied to the 3D point cloud 134 from the lidar. Having updated the point cloud with the event, the modeling processor may then control the lidar to scan the positions of the point cloud in more detail and more quickly. This allows possible objects as indicated by the temporal contrast to be identified quickly.

For navigation purposes, the objects in the 3D model can be compared to an intended path through the model to determine whether there are any obstacles in that path. In embodiments, the model has free, occupied, and unknown space. Any of these three categories of space may include visible space and occluded space. The occupied space is occupied by objects. These objects may or may not be identified. The navigation system is designed to keep the vehicle in the free space and away from obstacles in the occupied space. As described below, there may also be unknown areas for which the system cannot determine whether the space is free or occupied. This may be because the area is occluded or for another reason. The navigation system may then direct the vehicle controls to cause the vehicle to avoid the obstacles while maintaining travel in the direction of the path. In an automobile, the controls may be accelerator, brakes, and steering to keep the automobile on the road and in a lane without colliding with any object in the lane.

Figure 3:
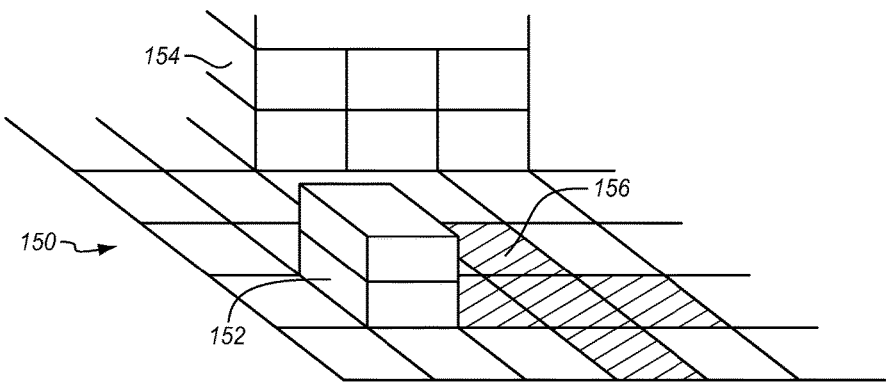
FIG. 3 is an isometric diagram of a scene model with occluded areas.

FIG. 3 is an isometric view diagram of a portion of a 3D model of a scene. The model may represent a roadway in front of an autonomous vehicle (not shown). The model is presented as a low-resolution grid with a predetermined resolution. The resolution may be adapted to suit the lidar point cloud data and the processing and memory capabilities in any particular implementation. In this case the model 150 has a vehicle 152 in front of the sensor and a building 154 to the side of the roadway. The 3D model provides height as well as position and depth. This may be useful if there are obstacles that are above the vehicle or below the vehicle or if the path does not have a level topography. The 3D model may also be useful for airborne or waterborne vehicles. The 3D model may have an occluded area 156 for which there is no current available data. The occluded area may be treated as occupied until more information is obtained.

If these objects are classified and correlated to points in the lidar, the points corresponding to the vehicle 152 in front of the sensor can be modeled as a single object so that tracking the movement of the points is computationally simpler. If the vehicle is moving, then it represents an obstacle but as a vehicle, the sensor can move down the roadway keeping a fixed distance to this obstacle with the expectation that deceleration of the vehicle is limited. If the other obstacle 154 to the side is classified as a building or wall then it will not have motion except with respect to the moving vehicle that carries the sensors and can be modeled as stationary on the grid. All of these objects are to be avoided by the vehicle as it travels down the roadway.

Figure 4:
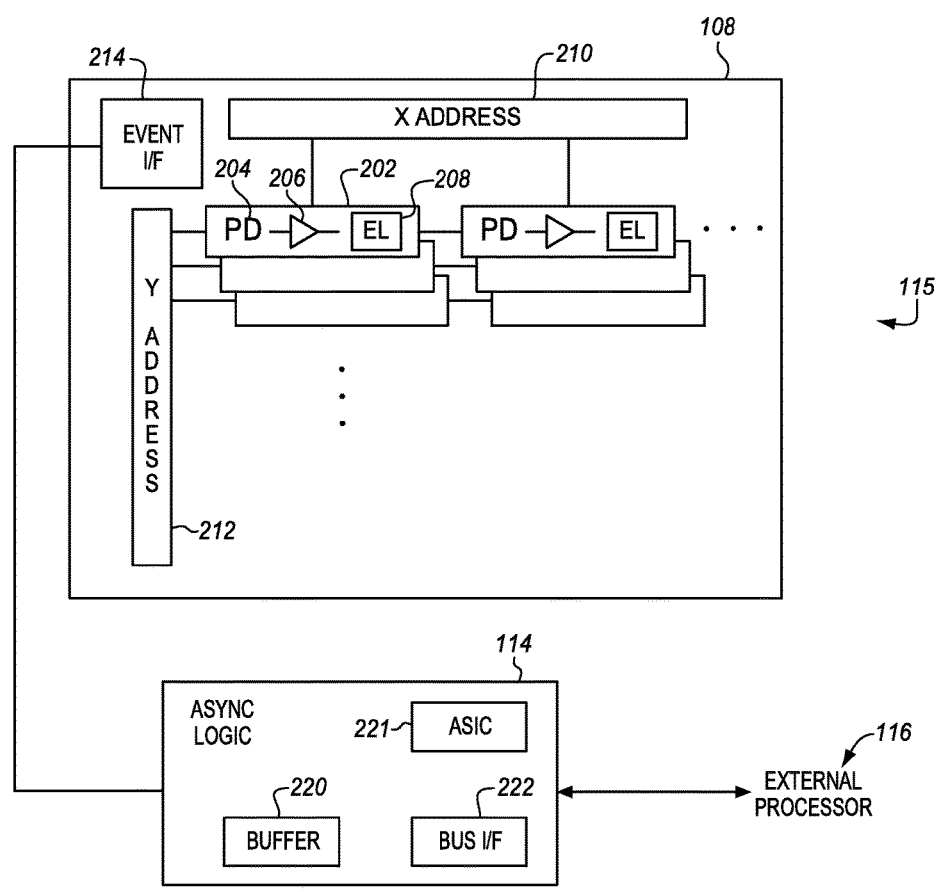
FIG. 4 is block diagram of a DVS system.

FIG. 4 is a block diagram of a DVS system 115 suitable for use with the described system. The DVS system has a temporal contrast sensor 108 to detect impinging light intensity changes with a horizontal and a vertical array of DVS pixels 202. Each DVS pixel has a photodetector 204 that generates a charge or voltage in response to incident light. The photodetector is coupled to an amplifier 206 to increase the voltage response. The amplifier is coupled to in-pixel event logic 208 that receives the amplified signal and determines whether there has been a significant change in the output of the photodetector. The change is referred to, in some cases, as temporal contrast (TC), being a contrast over time. When several DVS pixels in a contiguous group experience a change in the illumination level then there may be a leading edge of an object moving across the sensor field of view.

The particular photoreceptor configuration with photodetector and amplifier and event logic configuration may be adapted to suit different implementations. In some cases, the photoreceptor amplifier may be a differencing amplifier to receive timed photodetector samples that is coupled to on and off state comparators to determine when the difference exceeds a threshold. In another case, the amplifier may be a programmable gain amplifier coupled to an asynchronous delta modulator to determine when the output value of the amplifier changes. Any of a variety of other DVS photoreceptor and pixel configurations may alternatively be used.

The event logic 208 of each DVS pixel is coupled to horizontal address logic 210 and vertical address logic 212 of the sensor to encode each event with a DVS pixel address. These are coupled to an event interface 214 of the sensor that provides the event data in a useful form. The events may identify the particular DVS pixels by address and may also indicate an amplitude or other quantity for the event. These events may be bundled into a packet or set of packets or each event may be sent immediately as soon as it occurs.

The event interface 214 of the intensity change sensor 108 is coupled to the asynchronous logic 114 that in one embodiment includes a buffer 220 to buffer the received events and a bus interface 222 to format the events to send to an external processor, such as the modeling processor 116 described above. The async logic 114 may also include an ASIC (Application Specific Integrated Circuit), controller, or processor 221 to reconfigure or analyze the event data, depending on the particular implementation.

In some implementations, the ASIC or other controller 114 is instructed by the modeling processor to ignore certain TC events that correspond to particular tracked objects. In some DVS cameras, the readout circuitry's bandwidth can be overwhelmed by complex scenes with a large amount of movement. Depending on the DVS configuration, the ASIC can control the address or event interface or async (asynchronous) logic to effectively mask off sections of the field of regard covered by the DVS pixel array of the sensor. These are the sections that the modeling processor has modeled as having spurious movement or as corresponding to an object that is not of interest. By identifying and tracking objects in the model, the model is thereby used to control the areas of interest for the DVS camera. The DVS camera bandwidth is thereby focused on the areas of importance at any given time. The instructions from the modeling processor can change as the scene changes.

Figure 5:
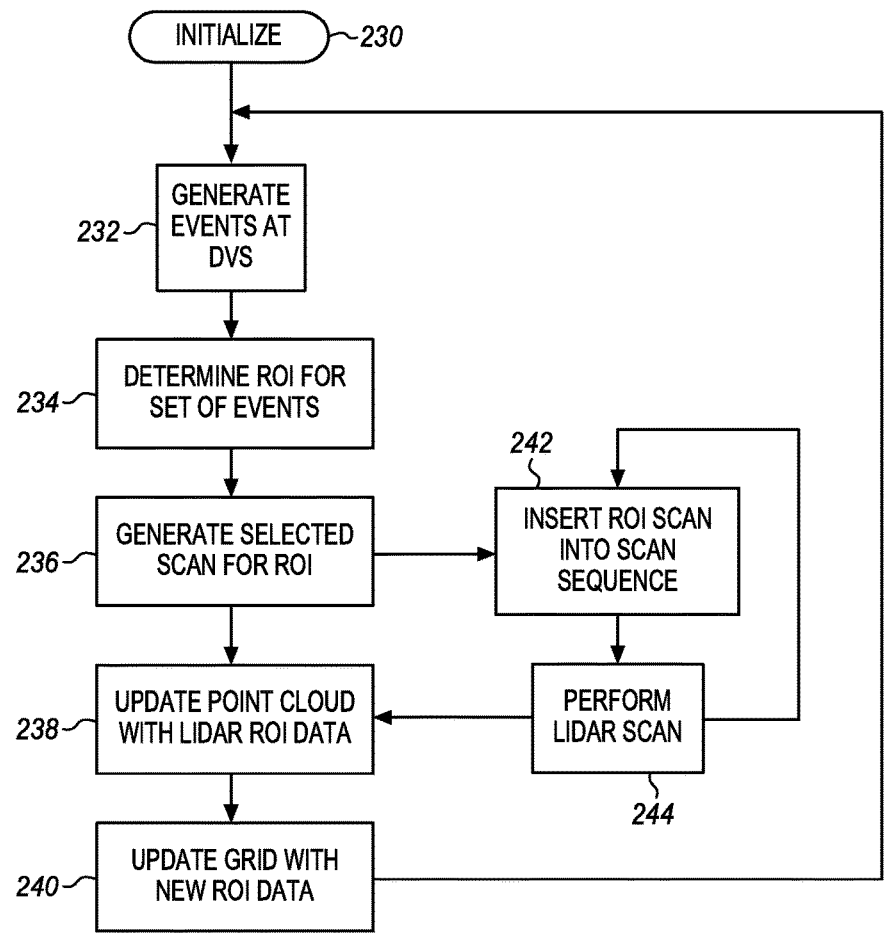
FIG. 5 is a process flow diagram of directing a lidar scan using a DVS.

FIG. 5 is a process flow diagram of directing an ROI lidar scan using a DVS system 115. The process is initialized at 230 and at 232 a DVS system generates events. The events relate to TC detected at certain places in the scene as observed by the intensity change sensor of the DVS. Based on these events at 234 a region of interest (ROI) in the lidar frame of reference and field of regard is determined. This ROI corresponds to the same part of the scene for which the TC events were generated. In effect, the DVS has detected activity at some place in the scene and an ROI is determined that corresponds to that place in the scene. At 236 scan parameters of the lidar system are adjusted for the ROI. In this example, a selected scan is generated for the ROI. The selected scan will be an urgent, more focused scan of the ROI. At 242 the ROI scan is inserted into the normal scan sequence. The ROI may then be scanned as soon as the current frame is completed or the current frame may be canceled in favor of the ROI scan. The next frame may then begin as soon as the ROI scan is completed. Alternatively, the ROI scan may be inserted into the next full frame scan, in such an example, the full frame may be scanned more quickly or at a lower resolution and when the scan comes to the ROI in the frame, then a slower or higher resolution is applied to the ROI.

The ROI scan is different from the normal sequence of frame captures at least in that it is performed quickly after the corresponding DVS event. The lidar scanner may have many different ways to adjust the scan as may be suitable for a particular ROI. The ROI scan may be adjusted by increasing the density of the scan lines. This will increase the available detail for the particular ROI. In order to increase the frame rate of normal scans, the lidar may scan fewer than all of the lines. The ROI scan can then allow for the ROI to be scanned at the full possible resolution or at a higher resolution. In other cases, the ROI scan may be adjusted by decreasing the scanning rate, a slower speed scan also allows more detail to be observed. The increased number of lines improves the vertical detail, while a slower scan speed increases the horizontal detail, in a way that may be described as adding more columns. For a pulsed lidar scanner laser, the ROI scan may be adjusted also by increasing the pulse repetition frequency of the emitted light pulses or by increasing the energy of the emitted light pulses. These two approaches increase the energy directed to the ROI so that a higher contrast return is incident on the lidar receiver. Each of these adjustments increase the amount of detail that the lidar system obtains about the ROI and can be combined in various combinations depending on the nature of the lidar and even on the suspected object in the ROI.

After the ROI scan has been inserted into the lidar scanner sequence at 242, the ROI scan is performed at 244. This provides more rapid information about the ROI and may also provide additional detail about the ROI. This information may then be applied to update the point cloud at 238. The updated point cloud from the lidar may then be applied to the 3D model 240 that is used for the system. Using the DVS, the 3D model can quickly obtain deep lidar information about objects that appear suddenly in the scene. The 3D model can be updated even before there is time for the next lidar frame to be captured. The DVS, in this way, allows for a much quicker update to the model and a more accurate model than might otherwise be present. The system then returns to 232 for any additional events from the DVS.

Figure 6:
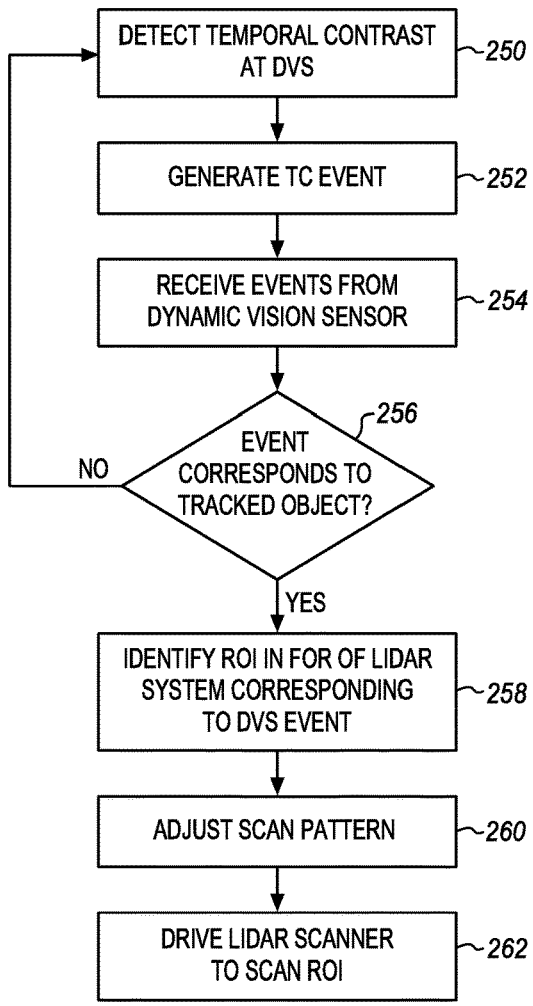
FIG. 6 is an alternative process flow diagram of directing a lidar scan using a DVS.
Figure 6:
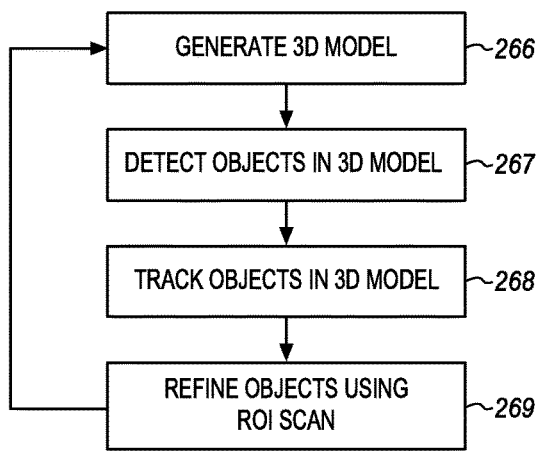

FIG. 6 is an alternative process flow diagram of directing an ROI lidar scan using a DVS system. At 250 temporal contrast is detected at the DVS. Typically, the DVS has a DVS pixel array, wherein each DVS pixel includes a photodetector and event logic. Each DVS pixel of the array detects a temporal contrast at a respective photodetector and each generates an event at 252 in response to the temporal contrast. As described above the sensor may include an amplifier and event logic or another structure. These pixel level events can be combined into a consolidated event signal at an event interface, an async logic block or another component or the events may each be sent to the model processor individually and asynchronously.

At 254 the events are received from the DVS. The events are received in some processing resource such as a processor that is coupled to the lidar system and to the dynamic vision sensor to receive the events. In FIG. 1, the modeling processor may perform this task or the lidar controller or another processing resource (not shown). The event is then analyzed against tracked objects at 256. If the event corresponds to an identified tracked object, then the process continues to the next TC event at 250.

In a separate process, a 3D model is generated at 266. This model can be created from a 3D point cloud of the lidar or from another source. A lidar system will have a light source that emits light, such as infrared laser light. The emitted light reflects from the scene in front of the laser light source and is received in a photosensitive sensor that detects at least a portion of the emitted light scattered by one or more remote targets in the scene. A scanner directs the emitted light along a scan pattern. The pattern is normally a sequence of horizontal lines starting at a top line and working vertically down to a bottom line, although other patterns may be used.

The return at the lidar sensor is used to generate a 3D point cloud that represents lidar returns. The point cloud is then analyzed at 267 to detect objects and then add these to the model. The detected objects are then tracked at 268 in the model. They may also be localized and classified so that the behavior of the objects can be predicted. This model may be used at 256 to determine whether a received event corresponds to an object that has already been detected. The modeling processor may then determine whether additional information is needed about the event. If the event corresponds to an unknown object, then at 258 an ROI is identified for the event. This ROI will be in the field of regard of the lidar system and will be used to drive a scan of the unknown object. In some cases, the event may relate to a known object but the object may be scanned to refine the information about the object.

At 260 after the ROI is identified, then the parameters of the scan pattern are adjusted to obtain the desired amount of additional information such as higher resolution or contrast and at 262 the lidar scanner is driven to scan the ROI using the adjusted scan parameters. This special ROI scan will provide more recent information about the object. It may also provide higher resolution or contrast than might be obtained from a standard frame from the lidar.

Self-driving or "autonomous" vehicles generally employ sensors, such as light detection and ranging (lidar) devices, to detect or "see" the surrounding environment as the vehicles move toward their destinations. Such vehicles include self-driving control systems that process the sensor data and, based on both the sensed environment and the desired destination, determine which maneuvers and operational states (e.g., speed, braking force, steering direction) are most appropriate on a more or less continuous basis throughout the trip. The principles and systems described herein may be applied to self-driving or autonomous vehicles among other uses. The systems described below show additional details of the systems above including more detail for some of the systems and alternatives to some of the systems above. The features of these systems may be combined in various ways to suit particular applications.

Figure 7:
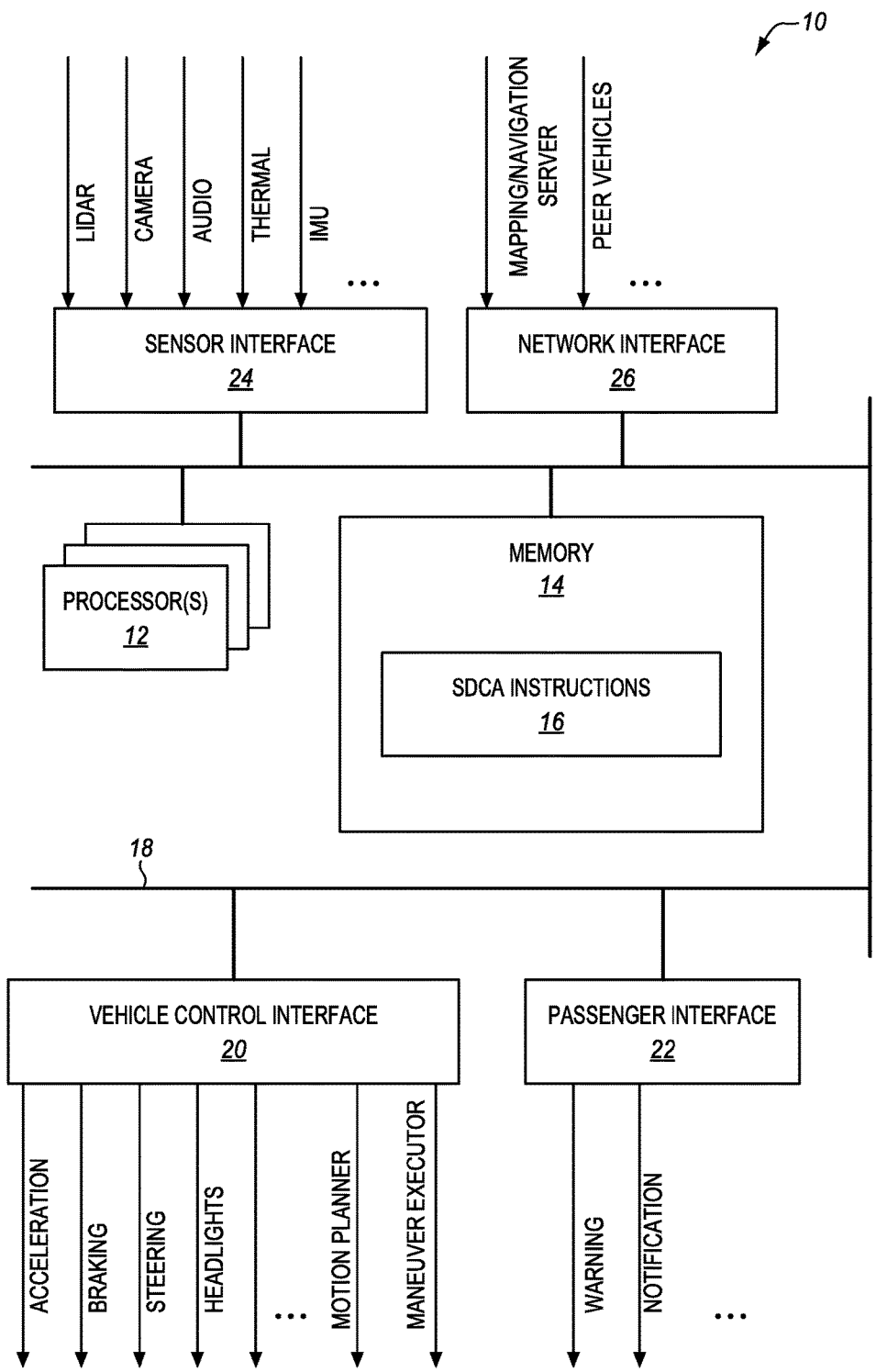
FIG. 7 is block diagram of an example computing system for controlling and/or operating an autonomous vehicle.

FIG. 7 includes a block diagram of an example computing system 10 for controlling and/operating an autonomous vehicle. The computing system 10 may be integrated within an autonomous vehicle in any suitable manner, and at any suitable location or locations within the vehicle. For example, the computing system 10 may be included, or partially included, within a vehicle controller that is on-board an autonomous vehicle, where the vehicle controller controls and/or operates at least some of the vehicle's driving subsystems that include mechanical components (e.g., accelerator, brakes, steering mechanism, lights, etc.) in a fully- or semi-autonomous manner. The computing system 10 includes one or more processors 12 and one or more tangible, non-transitory memories 14 storing thereon vehicle subsystem control and/or operation instructions 16, which are referred to herein as self-driving control architecture ("SDCA") instructions 16. Generally speaking, the SDCA instructions 16 generate decisions for controlling various operations, behaviors, and maneuvers of the autonomous vehicle. Such a system may also be adapted for fixed installations, for observation, monitoring, surveillance, or security.

In embodiments where the processor(s) 12 include more than a single processor, each processor may be a different programmable microprocessor that executes software instructions stored in the memory 14. Alternatively, each of the processor(s) 12 may be a different set of such microprocessors, or a set that includes one or more microprocessors and one or more other processor types (e.g., ASICs, FPGAs, etc.) for certain functions.

The memory 14 may include one or more physical memory devices with non-volatile memory. Any suitable memory type or types may be used, such as ROM, solid-state drives (SSDs), hard disk drives (HDDs), and so on. The processor(s) 12 are coupled to the memory 14 via a bus or other network 18. The network 18 may be a single wired network or may include any suitable number of wired and/or wireless networks. For example, the network 18 may be or include a controller area network (CAN) bus, a Local Interconnect Network (LIN) bus, and so on.

Also coupled to the network 18 are a vehicle control interface 20, a passenger interface 22, a sensor interface 24, and a network interface 26. Each of the interfaces 20, 22, 24 and 26 may include one or more processors (e.g., ASICs, FPGAs, microprocessors, etc.) and/or other hardware, firmware and/or software to enable communication with systems, subsystems, devices, etc., that are external to the computing system 10.

The vehicle control interface 20 is generally configured to provide control data generated by the processor(s) 12 executing the SDCA instructions 16 to the appropriate operational subsystems of the autonomous vehicle, such that the appropriate subsystems can effectuate driving decisions made by the processor(s) 12. For example, the vehicle control interface 20 may provide control signals to the appropriate driving-related subsystem(s) that include mechanical components, e.g., accelerator, brakes, steering mechanism, lights, etc. As another example, the vehicle control interface 20 may output or signals to appropriate subsystem(s) that plan the motion of the vehicle (e.g., a motion planner), and/or that control the execution of driving maneuvers (e.g., a maneuver executor). In some embodiments, the vehicle control interface 20 includes separate interface hardware, firmware and/or software for different operational subsystems.

The passenger interface 22 is generally configured to provide alerts, warnings, notifications, and/or other information to one or more passengers of the autonomous vehicle. In some embodiments where the vehicle is not fully autonomous (e.g., allowing human driving in certain modes and/or situations), the interface 22 may specifically provide such information to the driver (e.g., via dashboard indicators, etc.). As just one example, the passenger interface 22 may cause a display and/or speaker in the vehicle to generate an alert when the processor(s) 12 (executing the SDCA instructions 16) determine that a collision with another object is likely. As another example, the passenger interface 22 may cause a display in the vehicle to show an estimated time of arrival (ETA) to passengers. In some embodiments, the passenger interface 22 also permits certain user inputs. If the vehicle supports passenger selection of specific driving styles, for example, the passenger interface 22 may cause a display to present a virtual control (e.g., button) that a passenger may activate (e.g., touch, scroll through, etc.) to select a particular driving style.

The sensor interface 24 is generally configured to convert raw sensor data obtained by one or more sensor devices (e.g., lidar, camera, microphones, thermal imaging units, IMUs, etc.) to a format that is consistent with a protocol of the network 18 and that is recognized by one or more of the processor(s) 12. The sensor interface 24 may be coupled to an on-board lidar system and/or other type of active sensing system, for example, with the sensor interface 24 converting point cloud data generated by such system(s) into an appropriate format. In some embodiments, the sensor interface 24 includes separate interface hardware, firmware and/or software for each sensor device and/or each sensor type.

The network interface 26 is generally configured to convert data received from one or more devices or systems external to the autonomous vehicle to a format that is consistent with a protocol of the network 18 and is recognized by one or more of the processor(s) 12. In some embodiments, the network interface 26 includes separate interface hardware, firmware and/or software for different external sources. For example, a remote mapping/navigation server may send mapping and navigation/route data (e.g., mapping and navigation signals) to the computing system 10 via a first type of wireless network interface included the network interface 26, e.g., a cellular network interface, while one or more peer vehicles (e.g., other autonomous vehicles) may send data (e.g., current positions of the other vehicles) to the computing system 10 via a different type of wireless network interface included in the network interface 26, e.g., a Wi Fi network interface. Other types of external data may also, or instead, be received via the network interface 26. For example, the computing system 10 may use the network interface 26 to receive data representing rules or regulations (e.g., speed limits), object positions (e.g., road rails, overhanging signage, etc.), and/or other information from various infrastructure devices or systems.

In some embodiments, no sensor data (or only limited sensor data) of the autonomous vehicle is received via the sensor interface 24. Instead, the processor(s) 12 execute the SDCA instructions 16 using, as input, only (or primarily) data that is received by the network interface 26 from other vehicles, infrastructure, and/or other external devices/systems. In such an embodiment, the external data may include raw sensor data that is indicative of the vehicle environment (but was generated off-board the vehicle), and/or may include higher-level information that was generated externally using raw sensor data (e.g., occupancy grids).

Although not illustrated in FIG. 7, the network 18 may also couple to other types of interfaces and/or components. Additionally, in some embodiments, one or more of the interfaces shown in FIG. 7 may be omitted (e.g., the sensor interface 14, as discussed above). Moreover, it is understood that the computing system 10 represents just one possible configuration for supporting the software architectures, functions, features, etc., described herein, and that others are also within the scope of this disclosure.

Figure 8:
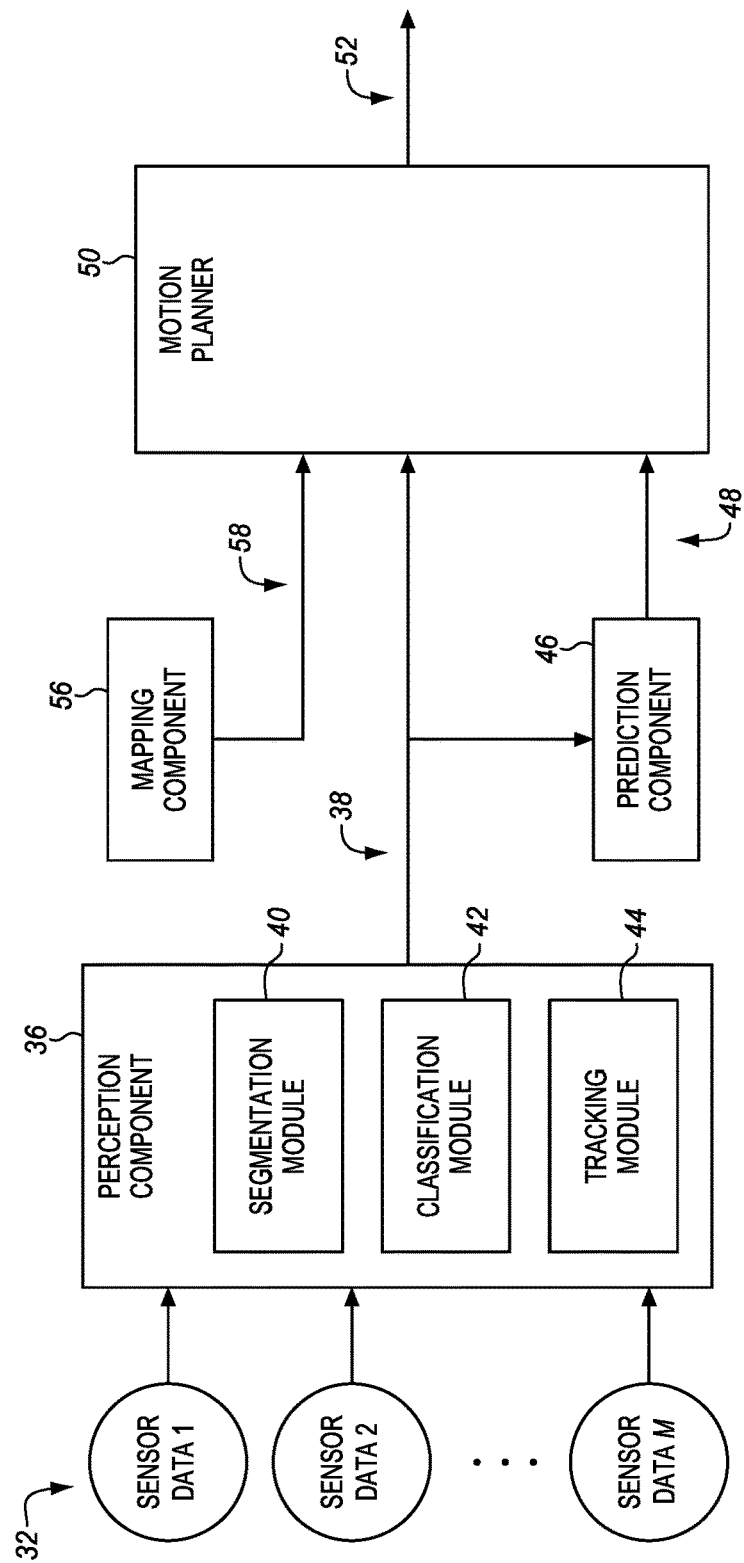
FIG. 8 is a block diagram of an example self-driving control architecture (SDCA) of an autonomous vehicle.

FIG. 8 illustrates an example self-driving control architecture (SDCA) 30 of an autonomous vehicle. Generally speaking, a SDCA 30 may generate instructions for controlling various operations and maneuvers of an autonomous vehicle. The SDCA 30 may be implemented by the SDCA instructions 16 of FIG. 7, in an embodiment. The SDCA 30 receives as input M sets of sensor data 32 generated by M different sensors, with M being any suitable integer equal to or greater than one. The sensor data 32 may be received via the sensor interface 24 of FIG. 7, in an embodiment. As just one example, "sensor data 1" may include frames of point cloud data generated by a first lidar device, "sensor data 2" may include frames of point cloud data generated by a second lidar device, "sensor data 3" (as indicated by the ellipsis) may include frames of digital images generated by a camera, and so on. As discussed above with respect to FIG. 7, the sensors may include one or more lidar devices, cameras, radar devices, thermal imaging units, IMUs, and/or other sensor types. Generally speaking, the SDCA 30 is configured to process point cloud data and, in some embodiments, is also configured to process two-dimensional image data, such as camera data.

The sensor data 32 is input to a perception component 36 of the SDCA 30, and is processed by the perception component 36 to generate perception signals 38 descriptive of a current state of the environment in which the autonomous vehicle is located. It is understood that the term "current" may actually refer to a very short time prior to the generation of any given perception signals 38, e.g., due to the short processing delay introduced by the perception component 36 and other factors. To generate the perception signals, the perception component may include a segmentation module 40, a classification module 42, and a tracking module 44.

The segmentation module 40 is generally configured to identify distinct objects within the sensor data representing the sensed environment. Depending on the embodiment and/or scenario, the segmentation task may be performed separately for each of a number of different types of sensor data, or may be performed jointly on a fusion of multiple types of sensor data. In some embodiments where lidar devices are used, the segmentation module 40 analyzes frames that include point cloud datasets therein to identify subsets of points within each frame that correspond to probable physical objects located in the environment. In other embodiments, the segmentation module 40 jointly analyzes lidar point cloud data frames in conjunction with camera image frames to identify objects that are located in the environment. Other suitable techniques, and/or data from other suitable sensor types, may also be used to identify objects. It is noted that, as used herein, references to different or distinct "objects" may encompass physical things that are entirely disconnected (e.g., with two vehicles being two different "objects," and the road on which the vehicles are traveling as yet a different "object"), as well as physical things that are connected or partially connected (e.g., with a vehicle being a first "object" and the vehicle's hitched trailer being a second "object"). The segmentation module 40 may use predetermined rules or algorithms to identify objects. For example, the segmentation module 40 may identify as distinct objects, within a point cloud, any clusters of points that meet certain criteria (e.g., having no more than a certain maximum distance between the points in the cluster, or having the same relative velocity). As another example, the segmentation module 40 may utilize one or more neural networks that have been trained to identify distinct objects within the environment (e.g., using supervised learning with generated labels for different objects within test data point clouds, etc.), or may utilize one or more other types of machine-learning based models that have been trained, by using test or training data, to discern, distinguish, and/or identify probably distinct objects within a source image.

The classification module 42 is generally configured to determine classes (labels, categories, etc.) for different objects that have been identified or distinguished by the segmentation module 40. Like the segmentation module 40, the classification module 42 may perform classification separately for different sets of the sensor data 32, or may classify objects based on data from multiple sensors, etc. Moreover, and also similar to the segmentation module 40, the classification module 42 may utilize one or more neural networks or other machine-learning based models to classify objects, where the neural networks and/or machine-learning models have been trained, by using a set of test or training data, to perform object classification.

The tracking module 44 is generally configured to track distinct objects over time (e.g., across multiple lidar point cloud or camera image frames). The tracked objects are generally objects that have been identified by the segmentation module 40, but may or may not be objects that were classified by the classification module 42, depending on the embodiment and/or scenario. The segmentation module 40 may assign identifiers to identified objects, and the tracking module 44 may associate existing identifiers with specific objects where appropriate (e.g., for lidar data, by associating the same identifier with different clusters of points, at different locations, in successive point cloud frames). Like the segmentation module 40 and the classification module 42, the tracking module 44 may perform separate object tracking based on different sets of the sensor data 32, or may track objects based on data from multiple sensors. Moreover, and also similar to the segmentation module 40 and the classification module 42, the tracking module 44 may utilize one or more neural networks or other machine-learning models to track objects, where the neural networks and/or machine-learning models have been trained, by using a set of test or training data, to perform object tracking across frames and/or images.

The SDCA 30 also includes a prediction component 46, which processes the perception signals 38 to generate prediction signals 48 descriptive of one or more predicted future states of the autonomous vehicle's environment. For a given object, for example, the prediction component 46 may analyze the type/class of the object (as determined by the classification module 42) along with the recent tracked movement of the object (as determined by the tracking module 44) to predict one or more future positions of the object. As a relatively simple example, the prediction component 46 may assume that any moving objects will continue to travel on their current direction and with their current speed, possibly taking into account first- or higher-order derivatives to better track objects that have continuously changing directions, objects that are accelerating, and so on. In some embodiments, the prediction component 46 also predicts movement of objects based on more complex behaviors. For example, the prediction component 46 may assume that an object that has been classified as another vehicle will follow rules of the road (e.g., stop when approaching a red light), and will react in a certain way to other dynamic objects (e.g., attempt to maintain some safe distance from other vehicles). The prediction component 46 may inherently account for such behaviors by utilizing a neural network or other machine learning model, for example. The prediction component 46 may be omitted from the SDCA 30, in some embodiments.

In some embodiments, the perception signals 38 include data representing "occupancy grids" (e.g., one grid per T milliseconds), with each occupancy grid indicating object positions (and possibly object boundaries, orientations, etc.) within an overhead view of the autonomous vehicle's environment. Within the occupancy grid, each "cell" (e.g., pixel) may be associated with a particular class as determined by the classification module 42, possibly with an "unknown" class for certain pixels that were not successfully classified. Similarly, the prediction signals 48 may include, for each such grid generated by the perception component 36, one or more "future occupancy grids" that indicate predicted object positions, boundaries and/or orientations at one or more future times (e.g., 1, 2 and 5 seconds ahead).

A mapping component 56 obtains map data (e.g., a digital map including the area currently being traversed by the autonomous vehicle) and/or navigation data (e.g., data indicating a route for the autonomous vehicle to reach the destination, such as turn-by-turn instructions), and outputs the data (possibly in a converted format) as mapping and navigation signals 58. In some embodiments, the mapping and navigation signals 58 include other map- or location-related information, such as speed limits, traffic indicators, and so on. The signals 58 may be obtained from a remote server (e.g., via a cellular or other communication network of the autonomous vehicle, or of a smartphone coupled to the autonomous vehicle, etc.), and/or may be locally stored in a persistent memory of the autonomous vehicle.

A motion planner 50 processes the perception signals 38, the prediction signals 48, and the mapping and navigation signals 58 to generate decisions 52 regarding the next movements of the autonomous vehicle. Depending on the type of the motion planner 50, the decisions 52 may include operational parameters (e.g., braking, speed and steering parameters) and/or particular maneuvers (e.g., turn left, move to right lane, move onto shoulder of road, etc.). The decisions 52 may be provided to one or more operational subsystems of the autonomous vehicle (e.g., if the decisions 52 indicate specific operational parameters for subsystems that include mechanical components, such as steering mechanisms, accelerator, brakes, lights, etc.), or may be provided to one or more intermediate stages that convert the decisions 52 into operational parameters (e.g., if the decisions indicate specific maneuvers to be performed by a maneuver executor).

The motion planner 50 may utilize any suitable type(s) of rules, algorithms, heuristic models, machine learning models, or other suitable techniques to make driving decisions based on the perception signals 38, prediction signals 48, and mapping and navigation signals 58. For example, the motion planner 50 may be a "learning based" planner (e.g., a planner that is trained using supervised learning or reinforcement learning), a "search based" planner (e.g., a continuous A* planner), a "sampling based" planner (e.g., a planner that performs random searches in a space that represents a universe of possible decisions), a "predictive control based" planner (e.g., a model predictive control (MPC) planner), and so on. In some embodiments, the motion planner 50 includes multiple, different motion planner types in order to provide a more diverse set of mechanisms for generating driving decisions, and thereby improve safety and/or other performance aspects of the autonomous vehicle.

Light detection and ranging (lidar) is a technology that can be used to measure distances to remote targets. Typically, a lidar system includes a light source and an optical receiver. The light source emits light toward a target which scatters the light, and some of the scattered light is received back at the receiver. The system determines the distance to the target based on one or more characteristics associated with the received light. For example, the lidar system may determine the distance to the target based on the time of flight for a pulse of light emitted by the light source to travel to the target and back to the lidar system.

Figure 9:
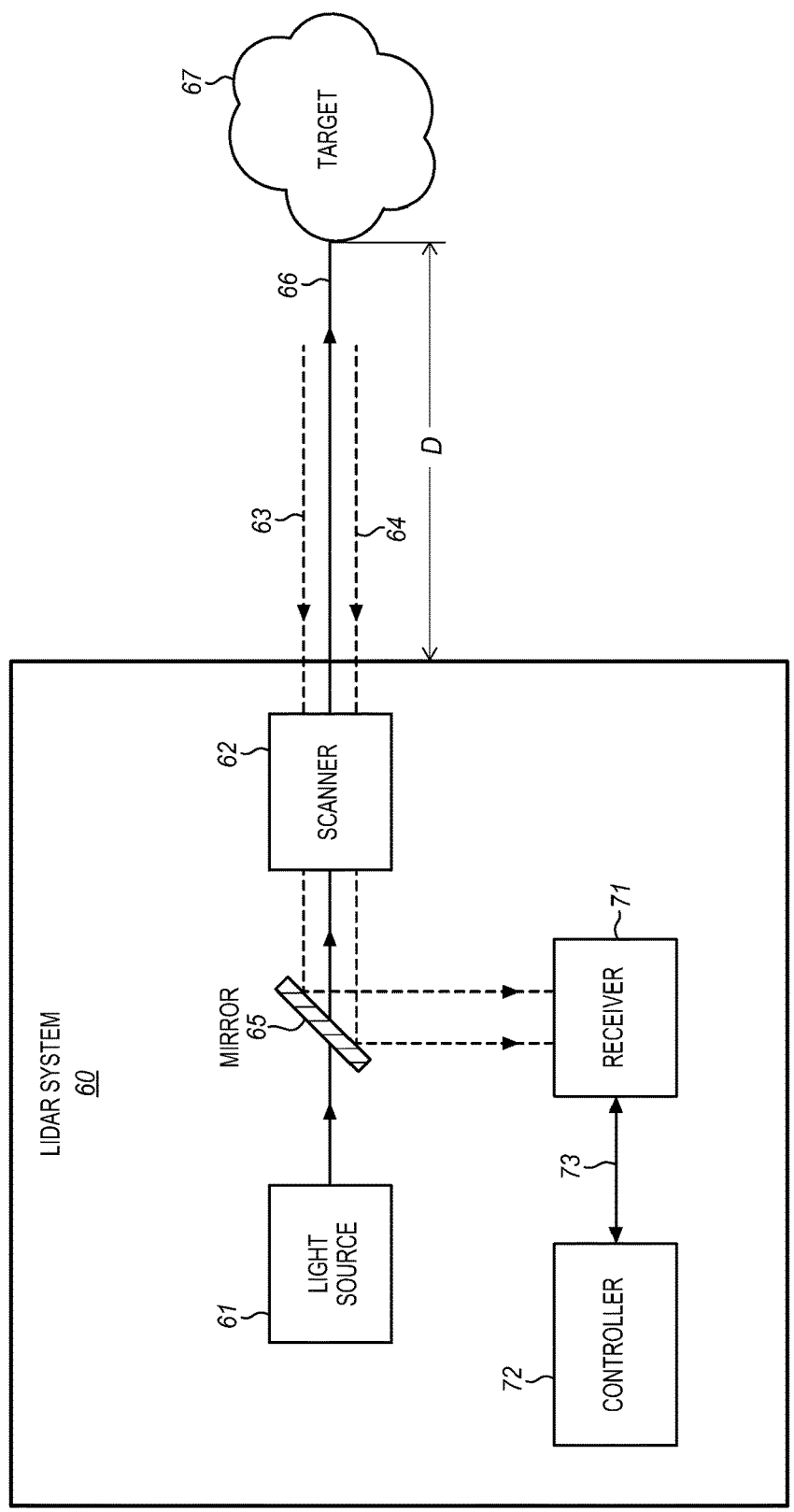
FIG. 9 is a block diagram of an example light detection and ranging (lidar) system.

FIG. 9 illustrates an example light detection and ranging (lidar) system 60. In particular embodiments, a lidar system 60 may include a light source 61, mirror 65, scanner 62, receiver 71, or controller 72. The light source 61 may include, for example, a laser which emits light having a particular operating wavelength in the infrared, visible, or ultraviolet portions of the electromagnetic spectrum. The light source 61 emits an output beam of light 66 which may be continuous wave (CW), pulsed, or modulated in any suitable manner for a given application. The output beam of light 66 is directed downrange toward a remote target 67.

Once the output beam 66 reaches the downrange target 67, the target may scatter or reflect at least a portion of light from the output beam 66, and some of the scattered or reflected light may return toward the lidar system 60. In the example of FIG. 1, the scattered or reflected light is represented by input beam 63, 64 which passes through scanner 62 and is reflected by mirror 65 and directed to receiver 71. In particular embodiments, a relatively small fraction of the light from output beam 66 may return to the lidar system 60 as input beam 63, 64.

In particular embodiments, receiver 71 may receive or detect photons from input beam 63, 64 and generate one or more representative signals. For example, the receiver 71 may generate an output electrical signal 73 that is representative of the input beam 63, 64 and the electrical signal 73 may be sent to controller 72. In particular embodiments, receiver 71 or controller 72 may include a processor, computing system (e.g., an ASIC or FPGA), or other suitable circuitry. A controller 72 may be configured to analyze one or more characteristics of the electrical signal 73 from the receiver 71 to determine one or more characteristics of the target 67, such as its distance downrange from the lidar system 60. This can be done, for example, by analyzing the time of flight or phase modulation for a beam of light 66 transmitted by the light source 61. If lidar system 60 measures a time of flight of T (e.g., T represents a round-trip time of flight for an emitted pulse of light to travel from the lidar system 60 to the target 67 and back to the lidar system 60), then the distance D from the target 67 to the lidar system 100 may be expressed as $D = c \cdot T/2$, where c is the speed of light (approximately $3.0 \times 10^8$ m/s).

In particular embodiments, lidar system 60 may include a scanner 62 configured to scan an output beam 66 across a field of regard of the lidar system 60. As an example, scanner 62 may include one or more scanning mirrors configured to pivot, rotate, oscillate, or move in an angular manner about one or more rotation axes. The output beam 66 may be reflected by a scanning mirror, and as the scanning mirror pivots or rotates, the reflected output beam 66 may be scanned in a corresponding angular manner.

In particular embodiments, a scanning mirror may be attached to a scanner actuator or mechanism which pivots or rotates the mirror over a particular angular range. A scanner actuator or mechanism configured to pivot or rotate a mirror may include a galvanometer scanner, a resonant scanner, a piezoelectric actuator, a voice coil motor, an electric motor (e.g., a DC motor, a brushless DC motor, a synchronous electric motor, or a stepper motor), a microelectromechanical systems (MEMS) device, or any other suitable actuator or mechanism.

In particular embodiments, scanner 62 may be configured to scan the output beam 66 (which may include at least a portion of the light emitted by light source 61) across a field of regard of the lidar system 60. A field of regard (FOR) of a lidar system 60 may refer to an area, region, or angular range over which the lidar system 60 may be configured to scan or capture distance information. In other embodiments, scanner 62 may be configured to direct the output beam 66 towards specific points in the FOR rather than scanning the output beam across the entire FOR, reducing the number of points captured by the lidar system.

In particular embodiments, a lidar system 60 may be used to determine the distance to one or more downrange targets 67. By scanning the lidar system 60 across a field of regard, the system can be used to map the distance to a number of points within the field of regard. Each of these depth-mapped points may be referred to as a pixel or a voxel. A collection of pixels captured in succession (which may be referred to as a depth map, a point cloud, or a frame) may be rendered as an image or may be analyzed to identify or detect objects or to determine a shape or distance of objects within the FOR. In particular embodiments, lidar system 60 may be configured to repeatedly capture or generate point clouds of a field of regard at any suitable frame rate. In particular embodiments, a point-cloud frame rate may be substantially fixed, or a point-cloud frame rate may be dynamically adjustable.

Although this disclosure describes or illustrates example embodiments of lidar systems 60 or light sources 61 that produce light waveforms that include pulses of light, the embodiments described or illustrated herein may also be applied to other types of light waveforms, including continuous-wave (CW) light or modulated light waveform. For example, a lidar system 60 as described or illustrated herein may include a light source 61 configured to produce pulses of light. Alternatively, a lidar system 60 may be configured to act as a frequency-modulated continuous-wave (FMCW) lidar system and may include a light source 61 configured to produce CW light or a frequency-modulated light waveform.

Although FIG. 9 utilizes one or more scanning mirrors to target the output beam, other embodiments of lidar system 60 may be used. In particular embodiments, lidar system 60 may be a flash lidar that captures an entire FOR with a single laser flash. In other embodiments, lidar system 60 may use lasers that are coupled to a mechanically rotating platform.

Figure 10:
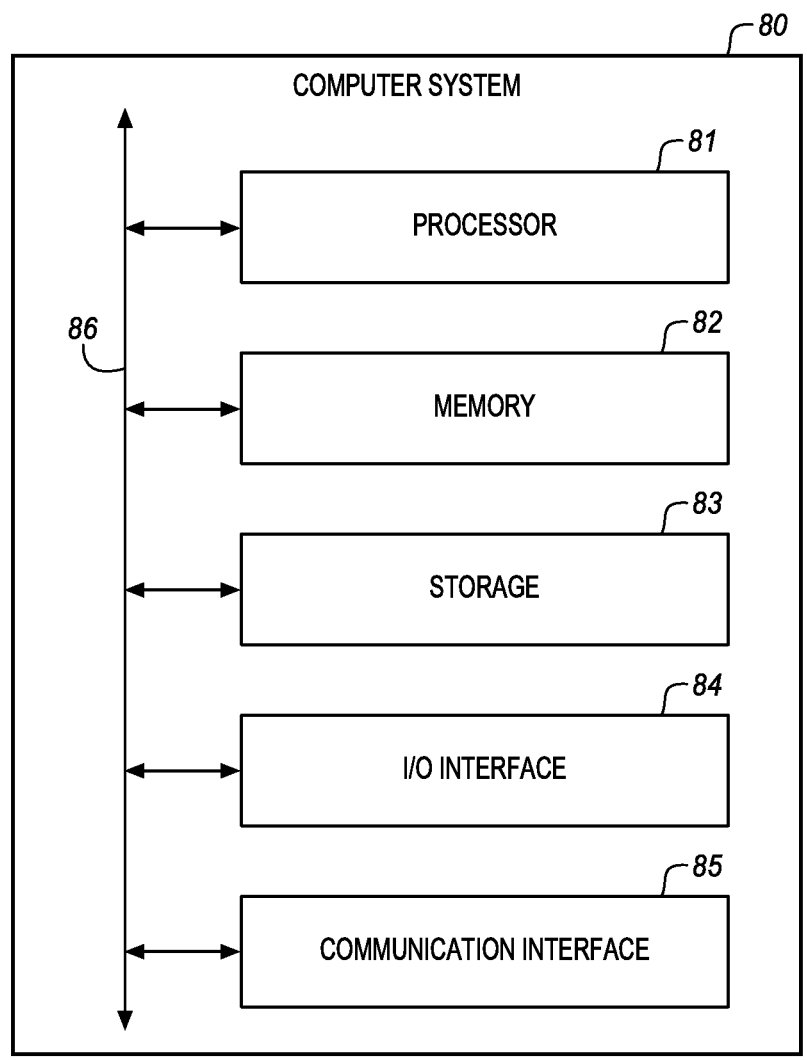
FIG. 10 is a block diagram of an example computer system.

FIG. 10 illustrates an example computer system 80. In particular embodiments, one or more computer systems 80 may perform one or more steps of one or more methods described or illustrated herein. In particular embodiments, one or more computer systems 80 may provide functionality described or illustrated herein. In particular embodiments, software running on one or more computer systems 80 may perform one or more steps of one or more methods described or illustrated herein or may provide functionality described or illustrated herein. Particular embodiments may include one or more portions of one or more computer systems 80. In particular embodiments, a computer system may be referred to as a processor, a controller, a computing device, a computing system, a computer, a general-purpose computer, or a data-processing apparatus. Herein, reference to a computer system may encompass one or more computer systems, where appropriate.

Computer system 80 may take any suitable physical form. As an example, computer system 80 may be an embedded computer system, a system-on-chip (SOC), a single-board computer system (SBC), a desktop computer system, a laptop or notebook computer system, a mainframe, a mesh of computer systems, a server, a tablet computer system, or any suitable combination of two or more of these. As another example, all or part of computer system 80 may be combined with, coupled to, or integrated into a variety of devices, including, but not limited to, a camera, camcorder, personal digital assistant (PDA), mobile telephone, smartphone, electronic reading device (e.g., an e-reader), game console, smart watch, clock, calculator, television monitor, flat-panel display, computer monitor, vehicle display (e.g., odometer display or dashboard display), vehicle navigation system, lidar system, ADAS, autonomous vehicle, autonomous-vehicle driving system, cockpit control, camera view display (e.g., display of a rear-view camera in a vehicle), eyewear, or head-mounted display. Where appropriate, computer system 80 may include one or more computer systems 80; be unitary or distributed; span multiple locations; span multiple machines; span multiple data centers; or reside in a cloud, which may include one or more cloud components in one or more networks. Where appropriate, one or more computer systems 80 may perform without substantial spatial or temporal limitation one or more steps of one or more methods described or illustrated herein. As an example, one or more computer systems 80 may perform in real time or in batch mode one or more steps of one or more methods described or illustrated herein. One or more computer systems 80 may perform at different times or at different locations one or more steps of one or more methods described or illustrated herein, where appropriate.

As illustrated in the example of FIG. 10 computer system 80 may include a processor 81, memory 82, storage 83, an input/output (I/O) interface 84, a communication interface 85, or a bus 86. Computer system 80 may include any suitable number of any suitable components in any suitable arrangement.

In particular embodiments, processor 81 may include hardware for executing instructions, such as those making up a computer program. As an example, to execute instructions, processor 81 may retrieve (or fetch) the instructions from an internal register, an internal cache, memory 82, or storage 83; decode and execute them; and then write one or more results to an internal register, an internal cache, memory 82, or storage 83. In particular embodiments, processor 81 may include one or more internal caches for data, instructions, or addresses. Processor 81 may include any suitable number of any suitable internal caches, where appropriate. As an example, processor 81 may include one or more instruction caches, one or more data caches, or one or more translation lookaside buffers (TLBs). Instructions in the instruction caches may be copies of instructions in memory 82 or storage 83, and the instruction caches may speed up retrieval of those instructions by processor 81. Data in the data caches may be copies of data in memory 82 or storage 83 for instructions executing at processor 81 to operate on; the results of previous instructions executed at processor 81 for access by subsequent instructions executing at processor 81 or for writing to memory 82 or storage 83; or other suitable data. The data caches may speed up read or write operations by processor 81. The TLBs may speed up virtual-address translation for processor 81. In particular embodiments, processor 81 may include one or more internal registers for data, instructions, or addresses. Processor 81 may include any suitable number of any suitable internal registers, where appropriate. Where appropriate, processor 81 may include one or more arithmetic logic units (ALUs); may be a multi-core processor; or may include one or more processors 81. In particular embodiments, processor 81 may be a general-purpose single- or multi-chip processor, a digital signal processor (DSP), an ASIC, a FPGA, any other suitable programmable-logic device, discrete gate or transistor logic, discrete hardware components, or any suitable combination thereof.

In particular embodiments, memory 82 may include main memory for storing instructions for processor 81 to execute or data for processor 81 to operate on. As an example, computer system 80 may load instructions from storage 83 or another source (such as, for example, another computer system 80) to memory 82. Processor 81 may then load the instructions from memory 82 to an internal register or internal cache. To execute the instructions, processor 81 may retrieve the instructions from the internal register or internal cache and decode them. During or after execution of the instructions, processor 81 may write one or more results (which may be intermediate or final results) to the internal register or internal cache. Processor 81 may then write one or more of those results to memory 82. One or more memory buses (which may each include an address bus and a data bus) may couple processor 81 to memory 82. Bus 86 may include one or more memory buses. In particular embodiments, one or more memory management units (MMUs) may reside between processor 81 and memory 82 and facilitate accesses to memory 82 requested by processor 81. In particular embodiments, memory 82 may include random access memory (RAM). This RAM may be volatile memory, where appropriate. Where appropriate, this RAM may be dynamic RAM (DRAM) or static RAM (SRAM). Memory 82 may include one or more memories 82, where appropriate.

In particular embodiments, storage 83 may include mass storage for data or instructions. As an example, storage 83 may include a hard disk drive (HDD), a floppy disk drive, flash memory, an optical disc, a magneto-optical disc, magnetic tape, or a Universal Serial Bus (USB) drive or a combination of two or more of these. Storage 83 may include removable or non-removable (or fixed) media, where appropriate. Storage 83 may be internal or external to computer system 80, where appropriate. In particular embodiments, storage 83 may be non-volatile, solid-state memory. In particular embodiments, storage 83 may include read-only memory (ROM). Where appropriate, this ROM may be mask ROM (MROM), programmable ROM (PROM), erasable PROM (EPROM), electrically erasable PROM (EEPROM), flash memory, or a combination of two or more of these. Storage 83 may include one or more storage control units facilitating communication between processor 81 and storage 83, where appropriate. Where appropriate, storage 83 may include one or more storages 83.

In particular embodiments, I/O interface 84 may include hardware, software, or both, providing one or more interfaces for communication between computer system 80 and one or more I/O devices. Computer system 80 may include one or more of these I/O devices, where appropriate. One or more of these I/O devices may enable communication between a person and computer system 80. As an example, an I/O device may include a keyboard, keypad, microphone, monitor, mouse, printer, scanner, speaker, camera, stylus, tablet, touch screen, trackball, another suitable I/O device, or any suitable combination of two or more of these. An I/O device may include one or more sensors. Where appropriate, I/O interface 84 may include one or more device or software drivers enabling processor 81 to drive one or more of these I/O devices. I/O interface 84 may include one or more I/O interfaces 84, where appropriate.

In particular embodiments, communication interface 85 may include hardware, software, or both providing one or more interfaces for communication (such as, for example, packet-based communication) between computer system 80 and one or more other computer systems 80 or one or more networks. As an example, communication interface 85 may include a network interface controller (NIC) or network adapter for communicating with an Ethernet or other wire-based network or a wireless NIC (WNIC); a wireless adapter for communicating with a wireless network, such as a WI-FI network; or an optical transmitter (e.g., a laser or a light-emitting diode) or an optical receiver (e.g., a photodetector) for communicating using fiber-optic communication or free-space optical communication. Computer system 80 may communicate with an ad hoc network, a personal area network (PAN), an in-vehicle network (IVN), a local area network (LAN), a wide area network (WAN), a metropolitan area network (MAN), or one or more portions of the Internet or a combination of two or more of these. One or more portions of one or more of these networks may be wired or wireless. As an example, computer system 80 may communicate with a wireless PAN (WPAN) (such as, for example, a BLUETOOTH WPAN), a WI-FI network, a Worldwide Interoperability for Microwave Access (WiMAX) network, a cellular telephone network (such as, for example, a Global System for Mobile Communications (GSM) network), or other suitable wireless network or a combination of two or more of these. As another example, computer system 80 may communicate using fiber-optic communication based on 100 Gigabit Ethernet (100 GbE), 10 Gigabit Ethernet (10 GbE), or Synchronous Optical Networking (SONET). Computer system 80 may include any suitable communication interface 85 for any of these networks, where appropriate. Communication interface 85 may include one or more communication interfaces 85, where appropriate.

In particular embodiments, bus 86 may include hardware, software, or both coupling components of computer system 80 to each other. As an example, bus 86 may include an Accelerated Graphics Port (AGP) or other graphics bus, a controller area network (CAN) bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these. Bus 86 may include one or more buses 86, where appropriate.

In particular embodiments, various modules, circuits, systems, methods, or algorithm steps described in connection with the implementations disclosed herein may be implemented as electronic hardware, computer software, or any suitable combination of hardware and software. In particular embodiments, computer software (which may be referred to as software, computer-executable code, computer code, a computer program, computer instructions, or instructions) may be used to perform various functions described or illustrated herein, and computer software may be configured to be executed by or to control the operation of computer system 80. As an example, computer software may include instructions configured to be executed by processor 81. In particular embodiments, owing to the interchangeability of hardware and software, the various illustrative logical blocks, modules, circuits, or algorithm steps have been described generally in terms of functionality. Whether such functionality is implemented in hardware, software, or a combination of hardware and software may depend upon the particular application or design constraints imposed on the overall system.

In particular embodiments, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various embodiments have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed is:

1. A sensor system comprising:
a dynamic vision sensor (DVS) having an array of DVS pixels, wherein each of the DVS pixels comprises a photodetector, and logic that is configured to detect temporal contrast and generate an event in response thereto;
a lidar system having a light source configured to emit light, a scanner configured to direct the emitted light along a scan pattern contained within a field of regard of the lidar system, and a receiver configured to detect at least a portion of the emitted light scattered by one or more remote targets in a scene; and
a processor coupled to the lidar system and to the dynamic vision sensor, wherein the processor is configured to generate a point cloud of the scene, to model objects detected in the point cloud of the scene in a model of the scene, to receive the event, to identify a region of interest in the field of regard that corresponds to DVS pixels that generated the event, to adjust a scan parameter of the lidar system in the region of interest, to refine the modeled objects using a scan of the region of interest with the adjusted parameter, to track objects in the scene over time using the model, and instructs the DVS logic to ignore events that correspond to a particular tracked object.

2. The system of claim 1, wherein the region of interest corresponds to an area of the DVS pixel array having the detected temporal contrast.

3. The system of claim 1, wherein the region of interest corresponds to an area of the DVS pixel array with only contiguous DVS pixels that generated the event.

4. The system of claim 1, wherein each of the DVS pixels further comprises a differencing circuit to detect a temporal contrast by detecting when light falling on the photodetector increases or decreases, and wherein the logic comprises asynchronous logic to generate an interrupt sent asynchronously to the processor as the event in response to the detected temporal contrast.

5. The system of claim 4, wherein the asynchronous logic generates an interrupt only when the increase or decrease exceeds a threshold.

6. The system of claim 1, wherein a scan of the region of interest is performed during a next scan pattern and has a higher resolution for the region of interest than for areas of the field of regard outside of the region of interest.

7. The system of claim 1, wherein a scan of the region of interest is performed before a next scan pattern and includes only the region of interest of the field of regard.

8. The system of claim 1, wherein the adjusted scan parameter includes resolution and a scan of the region of interest is performed at a higher resolution than a next scan pattern.

9. The system of claim 1, wherein the adjusted scan parameter includes resolution and frame rate and a scan of the region of interest is performed at one resolution and frame rate and a next scan pattern is scanned at a second resolution and frame rate.

10. The system of claim 1, wherein the processor is further configured to adjust the scan pattern of the scanner for the region of interest of the field of regard by at least one of increasing a density of scan lines, decreasing a scanning rate, increasing a pulse repetition frequency of the emitted light pulses, and increasing an energy of the emitted light pulses.

11. The system of claim 1, wherein modeling objects in model comprises modeling objects detected in the point cloud in a three-dimensional model of the scene including the objects.

12. The system of claim 1, wherein the processor compares events to tracked objects and prevents adjusting the scan parameter when an event corresponds to a tracked object.

13. The system of claim 1, wherein the system is included in a vehicle and the scene comprises a portion of a road in front of the vehicle and along which the vehicle is traveling.

14. The system of claim 1, wherein tracking objects in the scene over time comprises tracking objects through multiple scan patterns using the model.

15. A method comprising:
generating a point cloud of a scene;
modeling objects detected in the point cloud in a three-dimensional model of the scene including the objects;
receiving an event from a dynamic vision sensor that was generated in response to temporal contrast detected at photodetectors of the dynamic vision sensor directed at the scene;
identifying a region of interest in a field of regard of a lidar system that corresponds to positions of the photodetectors of the dynamic vision sensor that generated the event;
driving a scanner of the lidar system to perform a scan of the region of interest in the field of regard, the scanner directing emitted light pulses of the lidar along a scan pattern contained within the field of regard of the lidar system;
tracking the modeled objects in the scene over time using the model, and
comparing events to tracked objects and preventing driving the scanner to perform a scan of the corresponding region of interest when an event corresponds to a tracked object.

16. The method of claim 15, further comprising adjusting the scan pattern of the scanner for the region of interest of the field of regard by at least one of increasing a density of scan lines, decreasing a scanning rate, increasing a pulse repetition frequency of the emitted light pulses, and increasing an energy of the emitted light pulses.

17. The method of claim 15, further comprising:
refining the modeled objects using the scan of the region of interest.

18. The method of claim 17, further comprising instructing the dynamic vision sensor to effectively mask off a section of the field of regard that corresponds to a particular tracked object.

19. The method of claim 15, wherein tracking objects in the scene over time comprises tracking objects through multiple scan patterns using the model.

20. One or more computer-readable non-transitory storage media embodying software that is operable when executed to perform operations comprising:
generating a point cloud of a scene;
modeling objects detected in the point cloud in a three-dimensional model of the scene including the objects;
receiving an event from a dynamic vision sensor that generates the event in response to detecting temporal contrast at photodetectors of a photodetector array directed at the scene;
identifying a region of interest in a field of regard of a lidar system that corresponds to positions of the photodetectors of the dynamic vision sensor that generated the event;
driving a scanner of the lidar system to perform a scan of the region of interest in the field of regard, the scanner directing emitted light pulses of the lidar along a scan pattern contained within the field of regard of the lidar system; and
tracking the modeled objects in the scene over time through multiple scan patterns using the model;
comparing events to tracked objects and not identifying a region of interest if an event corresponds to a tracked object.

21. The media of claim 20, the operations further comprising adjusting the scan pattern of the scanner for the region of interest of the field of regard by increasing a density of scan lines.

22. The media of claim 20, wherein driving the scanner comprises driving the scanner to perform an additional scan of only the region of interest.

23. The media of claim 22, wherein the additional scan has a higher resolution than the multiple scan patterns.

* * * * *